United States Patent
Brock

(10) Patent No.: US 12,466,568 B2
(45) Date of Patent: Nov. 11, 2025

(54) PROPULSION SYSTEM WITH CONCENTRIC ROCKET MOTOR AND ELECTRIC MOTOR

(71) Applicant: Raytheon Company, Arlington, VA (US)

(72) Inventor: Keith M. Brock, Vail, AZ (US)

(73) Assignee: Raytheon Company, Arlington, VA (US)

( * ) Notice: Subject to any disclaimer, the term of this patent is extended or adjusted under 35 U.S.C. 154(b) by 0 days.

(21) Appl. No.: 18/594,762

(22) Filed: Mar. 4, 2024

(65) Prior Publication Data

US 2025/0276796 A1    Sep. 4, 2025

(51) Int. Cl.
*B64D 27/33*  (2024.01)
*B64D 27/02*  (2006.01)
*B64F 1/04*   (2024.01)

(52) U.S. Cl.
CPC .......... *B64D 27/33* (2024.01); *B64D 27/023* (2013.01); *B64D 27/026* (2024.01); *B64F 1/04* (2013.01)

(58) Field of Classification Search
CPC .... B64D 27/33; B64D 27/026; B64D 27/023; B64F 1/04
See application file for complete search history.

(56) References Cited

U.S. PATENT DOCUMENTS

| | | | |
|---|---|---|---|
| 5,505,408 A * | 4/1996 | Speicher | F42B 10/663 |
| | | | 244/3.22 |
| 6,543,716 B1 * | 4/2003 | Miller | G01S 13/72 |
| | | | 244/3.21 |
| 7,557,476 B2 | 7/2009 | Brock | |
| 10,014,748 B2 | 7/2018 | Livingston | |
| 10,116,187 B1 | 10/2018 | Wishart | |
| 11,309,768 B2 | 4/2022 | Sun | |
| 2008/0245924 A1 | 10/2008 | Arlton | |
| 2015/0267996 A1 * | 9/2015 | Su | B64F 1/06 |
| | | | 89/1.816 |
| 2018/0044029 A1 | 2/2018 | Koegler | |
| 2018/0215482 A1 * | 8/2018 | Zhang | B64U 10/14 |
| 2021/0031913 A1 | 2/2021 | Martel | |

* cited by examiner

*Primary Examiner* — Rodney A Bonnette
(74) *Attorney, Agent, or Firm* — Schwegman Lundberg & Woessner, P.A.

(57) ABSTRACT

A propulsion system, such as for an aircraft, for instance an unmanned aircraft system (UAS), includes a rocket motor and an electric motor, with the rocket motor passing through a central opening in the electric motor. The electric motor may be a brushless outrunner electric motor, with a rotor of the electric motor radially outward of a stator of the electric motor. The electric motor may use part of the rocket motor, such as a rocket nozzle (to give a non-limiting example), and may be used to turn blades of a propeller, to propel the aircraft. The propeller blades may be foldable blades, hingedly coupled to a yoke. The blades may deploy after launch of the aircraft, such as from a launcher, for instance a launch tube.

20 Claims, 3 Drawing Sheets

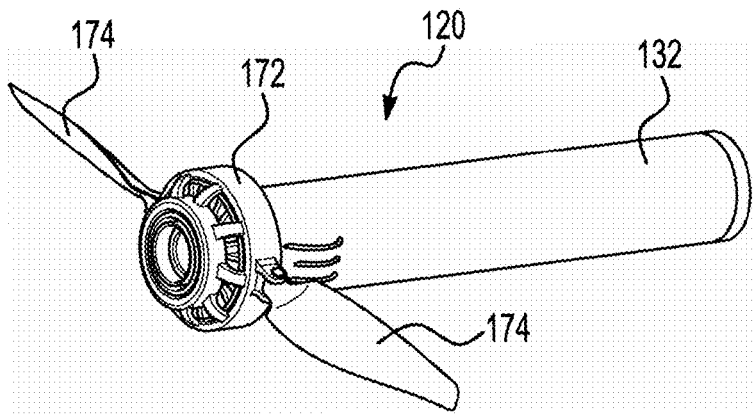
FIG. 5
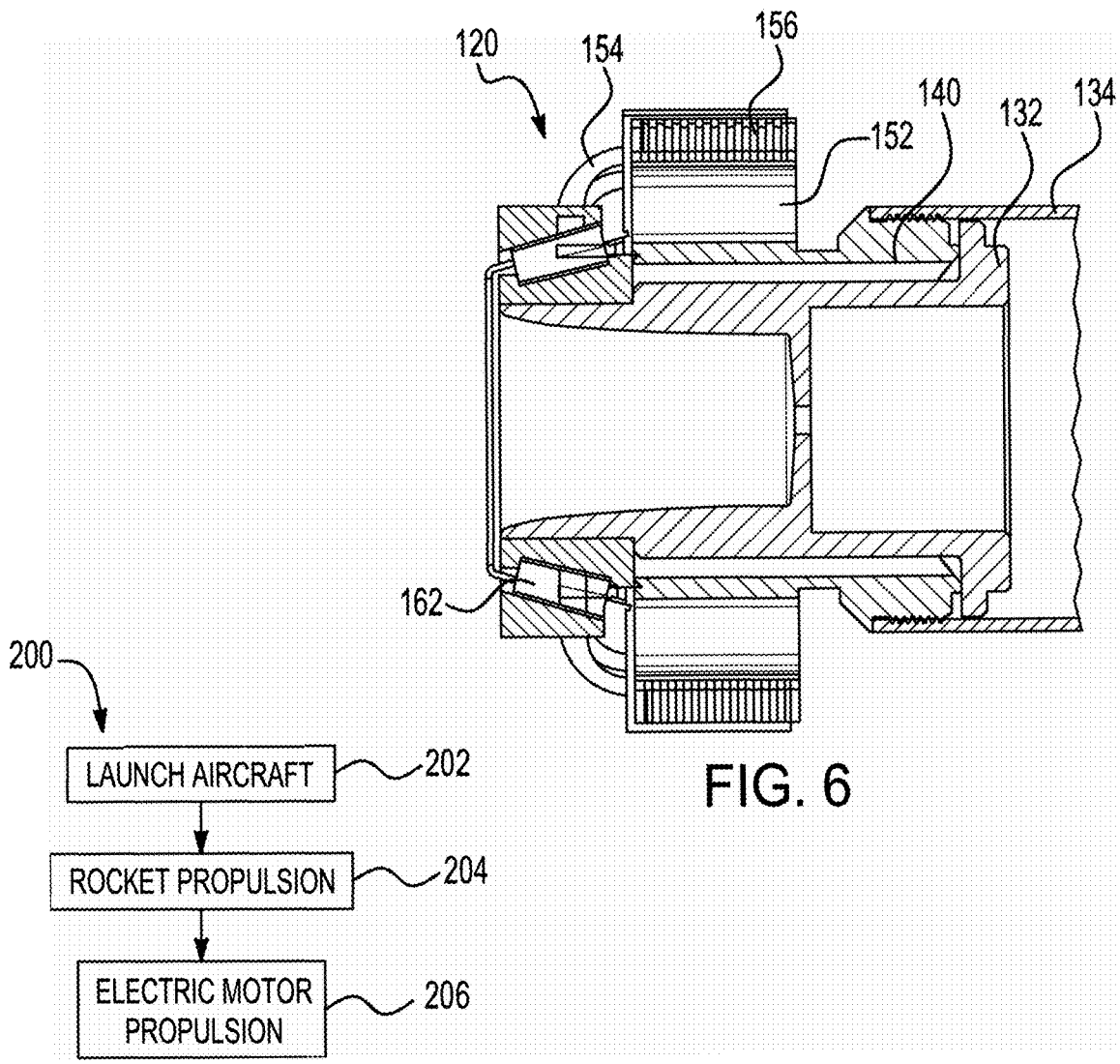
FIG. 6
FIG. 7

PROPULSION SYSTEM WITH CONCENTRIC ROCKET MOTOR AND ELECTRIC MOTOR

GOVERNMENT LICENSE RIGHTS

This disclosure was made with Government support under contract number HQ0727-16-D-0006. The Government has certain rights in the invention.

FIELD

The disclosure is in the field of aircraft propulsion systems.

BACKGROUND

A tube-launched unmanned aircraft vehicle (UAV) or unmanned aircraft system (UAS) may be launched from a launcher from land, sea, or air. Such a UAV or UAS may include a rocket motor for rapid acceleration. A sabot may be used in the launcher, but such a structure adds parts and launch debris.

SUMMARY

An aircraft has a propulsion system that has a rocket motor that is concentric with an annular electric motor.

According to an aspect of the disclosure, a propulsion system includes: a rocket motor; and an electric motor around the rocket motor, the electric motor being annular and the rocket motor passing through a central opening defined by the electric motor.

According to an embodiment of any paragraph(s) of this summary, the rocket motor includes a nozzle piece that passes through the central opening.

According to an embodiment of any paragraph(s) of this summary, the nozzle piece is made of a phenolic (or another suitable material).

According to an embodiment of any paragraph(s) of this summary, the propulsion system further includes a propeller operatively coupled to the electric motor, the propeller being driven to rotation by the electric motor.

According to an embodiment of any paragraph(s) of this summary, the propeller rotates about a central axis that is common to both the rocket motor and the electric motor.

According to an embodiment of any paragraph(s) of this summary, the propeller includes foldable propeller blades that fold from a yoke that is rotated by the rocket motor.

According to an embodiment of any paragraph(s) of this summary, the propeller blades have hinged connections to the yoke.

According to an embodiment of any paragraph(s) of this summary, the electric motor is a brushless outrunner electric motor (as a non-limiting example), with a rotor of the electric motor radially outward of a stator of the electric motor.

According to an embodiment of any paragraph(s) of this summary, the rocket includes a rocket nozzle that provides a hub to support the electric motor.

According to an embodiment of any paragraph(s) of this summary, the propulsion further includes a spacer between the rocket nozzle and electric motor.

According to an embodiment of any paragraph(s) of this summary, the spacer provides thermal isolation between the rocket nozzle and the electric motor.

According to an embodiment of any paragraph(s) of this summary, the spacer is made of aluminum (or another suitable material).

According to an embodiment of any paragraph(s) of this summary, the electric motor includes a drum (or casting).

According to an embodiment of any paragraph(s) of this summary, the drum includes a rotor, made up of rotor elements, such as magnets, on an inner surface of the drum.

According to an embodiment of any paragraph(s) of this summary, the propulsion system further includes a yoke fixedly attached to an outside of the drum.

According to an embodiment of any paragraph(s) of this summary, propeller blades are hingedly coupled to the yoke.

According to an embodiment of any paragraph(s) of this summary, the propulsion system further includes bearings that allow the drum to rotate around a central axis of propulsion system.

According to an embodiment of any paragraph(s) of this summary, the propulsions system is part of an aircraft.

According to an embodiment of any paragraph(s) of this summary, the aircraft is tube launched.

According to an embodiment of any paragraph(s) of this summary, the aircraft is rail launched.

According to another aspect, a method of operation of an aircraft includes the steps of: launching the aircraft from a launcher; propelling the aircraft with a rocket motor of a propulsion system of the aircraft; and subsequently propelling the aircraft with propeller blades that are coupled to an electric motor of the propulsion system, wherein the electric motor is an annular electric motor that surrounds a part of the rocket motor.

According to an embodiment of any paragraph(s) of this summary, the electric motor surrounds a nozzle piece of the rocket motor.

According to an embodiment of any paragraph(s) of this summary, the electric motor surrounds a non-nozzle piece of the rocket motor.

While a number of features are described herein with respect to embodiments of the disclosure; features described with respect to a given embodiment also may be employed in connection with other embodiments. The following description and the annexed drawings set forth certain illustrative embodiments of the disclosure. These embodiments are indicative, however, of but a few of the various ways in which the principles of the disclosure may be employed. Other objects, advantages, and novel features according to aspects of the disclosure will become apparent from the following detailed description when considered in conjunction with the drawings.

BRIEF DESCRIPTION OF THE DRAWINGS

The annexed drawings, which are not necessarily to scale, show various aspects of the disclosure.

FIG. 5 is an oblique view of a propulsion system, according to an alternate embodiment.

FIG. 6 is a cutaway view of the propulsion system of FIG. 5.

FIG. 7 is a high-level flow chart of a method for operating an aircraft, according to an embodiment of the disclosure.

DETAILED DESCRIPTION

A propulsion system, such as for an aircraft, for instance an unmanned aircraft system (UAS), includes a rocket motor and an electric motor, with the rocket motor passing through a central opening in the electric motor. The electric motor may be a brushless outrunner electric motor, with a rotor of the electric motor radially outward of a stator of the electric motor. The electric motor may surround part of the rocket motor, such as a rocket nozzle (or other suitable part of the rocket), and may be used to turn blades of a propeller, to propel the aircraft. The propeller blades may be foldable blades, hingedly coupled to a yoke. The blades may deploy after launch of the aircraft, such as from a launcher, for instance a launch tube. The launcher may itself be part of another aircraft, such as a helicopter or airplane, from a fixed or mobile ground source, or from a ship or other seaborne launch platform.

Figure 1:
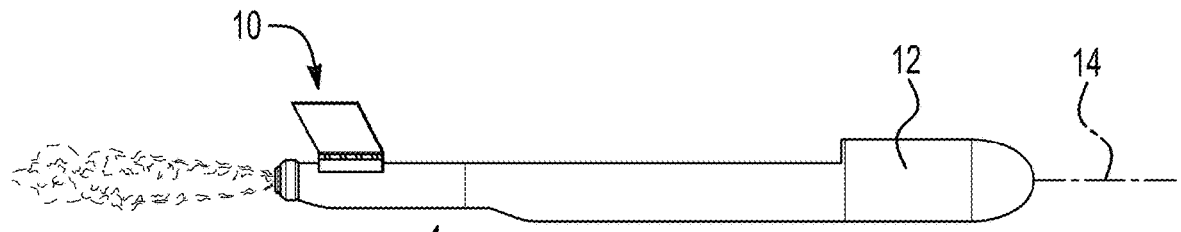
FIG. 1 is a sideview of an aircraft according to an embodiment of the present disclosure.

FIG. 1 shows an aircraft 10, such as an unmanned aircraft system (UAS). The UAS may be a missile, for example, and may be launched from a launcher, such as a launch tube. As an alternative, the aircraft 10 may be configured to be rail launched. As a non-limiting example, the UAS may be launched from another aircraft, such as a helicopter or airplane.

The aircraft 10 may have fuselage 12 having a central axis 14, and a propulsion system 20. The propulsion system 20 may propel the aircraft during launch and/or after launch (during flight). The aircraft 10 may have any of a variety of other components, some of which may be involved in controlling the flight of the aircraft 10.

Figure 2:
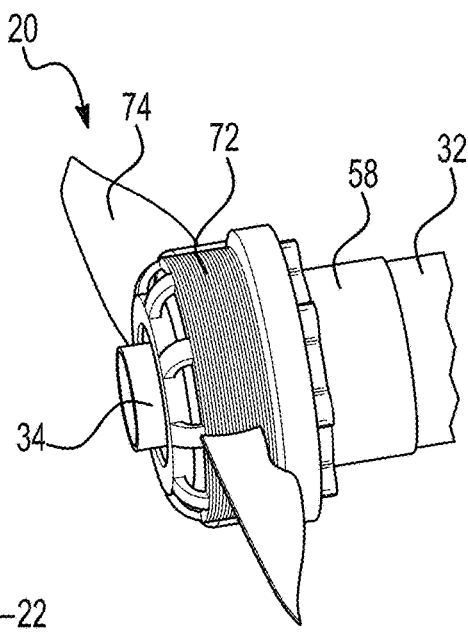
FIG. 2 is an oblique view of a propulsion system, according to an embodiment, that is part of the aircraft of FIG. 1.
Figure 3:
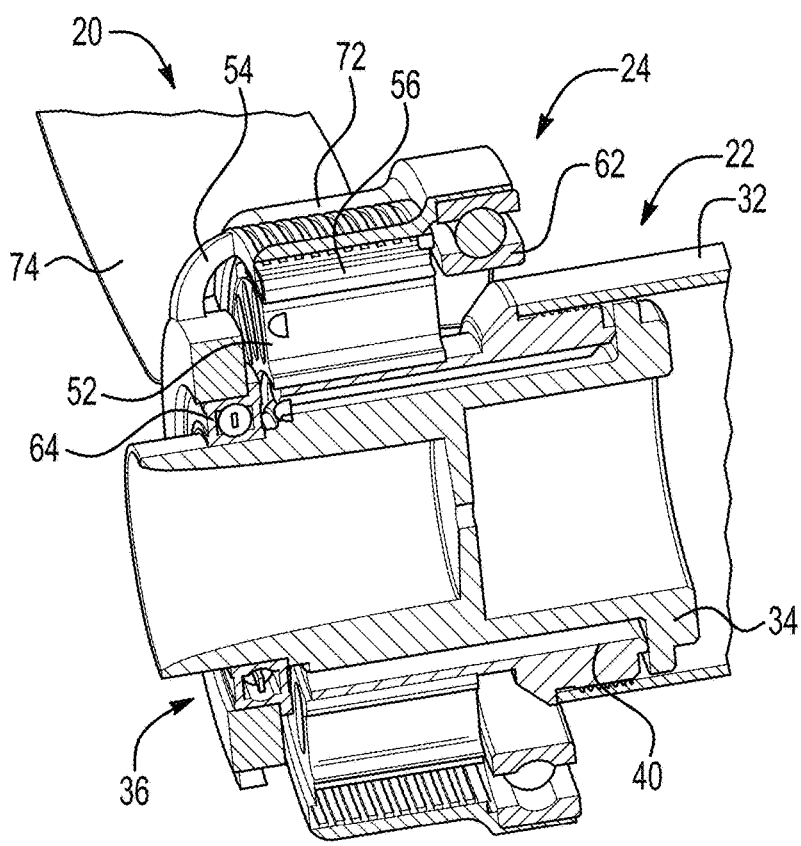
FIG. 3 is a cutaway view of the propulsion system of FIG. 2.
Figure 4:
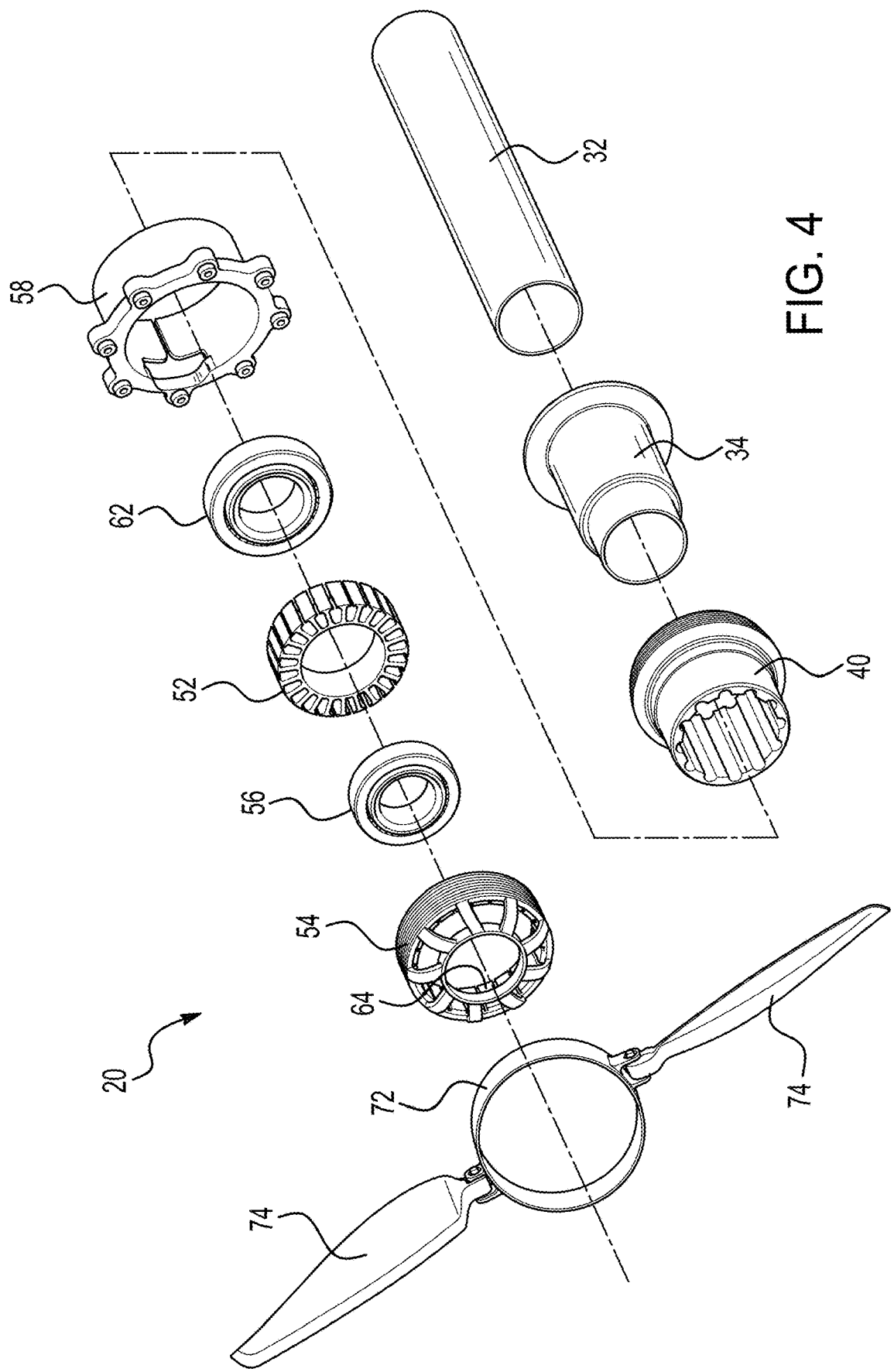
FIG. 4 is an exploded view of the propulsion system of FIG. 2.

FIGS. 2-4 show details of an embodiment of the propulsion system 20. The propulsion system 20 includes a rocket motor 22 and an electric motor 24. The rocket motor 22 includes a rocket tube 32, and a rocket nozzle piece 34 that fits into an aft end of the rocket tube 32. The rocket tube 32 may be made of a suitable metal or other material, and may include elements of the rocket motor 22, such as fuel and an ignition system.

The nozzle piece 34 may be made of any of a variety of suitable materials, such as a phenolic material (to give a non-limiting example of a suitable material). The nozzle piece 34 provides a structure for directing out of the rocket motor 22 the exhaust gasses that provide rocket thrust. In addition, the nozzle piece 34 provides a support for the electric motor 24 that surrounds the nozzle piece 34.

The nozzle piece 34 passes through a central opening 36 in the electric motor 24, which has an annular shape. A thermal isolation spacer 40 is located radially between the nozzle piece 34 and the electric motor 24. The thermal isolation spacer 40 provides thermal isolation between the nozzle piece 34, which is exposed to hot exhaust gasses, and the electric motor 24, for which excessive heating would be undesirable. The thermal isolation spacer 40 may be made of a suitable material, for example aluminum (to give a non-limiting example).

The electric motor 24 may be a brushless outrunner electric motor that includes a fixed stator 52 that is coupled to the thermal isolation spacer 40, and a drum (or casting) 54 that contains a rotor 56, and that rotates around the stator 52, and about the aircraft axis 14. The rotor 56 may have a number of rotor elements (magnets) mounted on an inner surface of the drum or casting 54.

A ring mount 58 is used to couple the electric motor 24 to the end of the aircraft 10, around the rocket tube 32. The ring mount 58 may have a hole in it to allow passage therethrough for wires, such as for providing power to the electric motor 24.

Bearings 62 and 64, at fore and aft sides of the drum 54, allow for rotation of the drum 54 (which contains the rotor 56), relative to parts of the motor 24 that are radially inward of the drum 54. The number of bearings may be varied based on loads and on desired performance, such as a desire to prevent wobbling despite increased side forces on the drum 54 during high-speed maneuvers. The bearings 62 and 64 may be any of a variety of suitable bearings, such ball bearings.

A yoke 72 with propeller blades 74 is coupled to an outside of the drum 54. Rotation of the drum 54 rotates the yoke 72 and its propeller blades 74. The propeller blades 74 may be folding propeller blades that are folded inward (toward a central axis of the aircraft 10) during launch of the aircraft 10. This allows the aircraft 10 to be launched from a launch tube or other suitable launcher in a compact configuration, with the propeller blades 74 then deployed by being unfolded outward, to thereby be configured to provide thrust when the yoke 72 is rotated. The propeller blades 74 may be hingedly coupled to the yoke 72 to allow for the folding inward and unfolding outward. The hinged couplings may involve fasteners on yoke 72, for example for receiving pins (not shown) for coupling the propeller blades 74 to the yoke 72. Many other suitable configurations for the couplings are possible, for example involving a nut-and-bolt assembly, a clip, or some combination of these and/or mechanical parts.

The stator 52 may include an electromagnet structure. The electromagnet structure may suitably generate an electromagnetic field, and may include any suitable structure, system, and device, configured in any suitable manner. For example, electromagnet structure may comprise a core of any size, shape, configuration, geometry and/or symmetry. The core may include any suitable combination of materials, for example a ferrous core and/or the like. In addition, the electromagnet structure may include any number of windings around the core. The windings may be of any suitable material of any size, shape, configuration, geometry, and/or symmetry. As a nonlimiting example, three separate windings may be wrapped around the teeth of the core in an alternating pattern to create a three-phase electromagnet.

The rotor 56 may include any number of magnets coupled to allow the drum 54 to rotate in response to the magnetic field generated by electromagnetic stator 52. The drum 54 may interact with electromagnet structure of the stator 52 in any suitable manner. In an exemplary aspect, the electric motor 24 may include a power source coupled to the stator 52 such as a battery, solar cell and/or the like. The electric motor 24 may also include a speed controller interposed between the power source and stator 52 to variably supply electric current from the power source to electromagnet structure of the stator 52. Any means of varying the voltage and/or current applied to the electromagnet structure may be used as a speed controller, an electronically controlled rheostat and/or the like.

For example, and without limitation, stator magnets coupled to interior portion of the drum 54 may alternate between north and south poles. When the coil of stator electromagnet is activated by a speed controller with power from a power source, the magnets coupled to interior portion of drum 54 will attract and repel from the coil causing rotation of the drum 54 about the axis 14 of aircraft 10. The rotational velocity with which the drum 54 rotates may correspond to the strength of the electromagnetic field generated by the electromagnet structure of the stator 52, which may be varied, for example, in order to throttle the velocity of the electric motor 24. Additionally, the rotational direction drum 54 rotates may depend on the polarity of the magnetic field generated by electromagnet structure of the stator 52, and may be controlled via a speed controller or a separate switch to reverse polarity.

FIGS. 5 and 6 show an alternate embodiment, a propulsion system 120 that includes only a single bearing 162, which in the illustrated embodiment is a tapered thrust bearing. Other parts of the propulsions system 120, a rocket tube 132, a nozzle piece 134, a thermal isolation spacer 140, a stator 152, a drum 154, a rotor 156, a yoke 172 with propeller blades 174 hingedly mounted thereto, may be similar to corresponding parts of the propulsion system 20 (FIGS. 2-4).

FIG. 7 shows a flowchart of a method 200 for operating an aircraft having a propulsion system such as that described above. In step 202 the aircraft 10 is launched from a launcher. The launch may advantageously done without a sabot, or other insert, reducing parts and the number of objects expelled from the launcher. In step 204 the rocket motor propels the aircraft during a first stage of flight. In step 206 the electric motor turns the propeller to provide thrust during a second (later) stage of flight.

Although the disclosure has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure. In addition, while a particular feature of the disclosure may have been described above with respect to only one or more of several illustrated embodiments, such feature may be combined with one or more other features of the other embodiments, as may be desired and advantageous for any given or particular application.

What is claimed is:

1. A propulsion system comprising:
    a rocket motor; and
    an electric motor around the rocket motor, the electric motor being annular and the rocket motor passing through a central opening defined by the electric motor.

2. The propulsion system of claim 1, wherein the rocket motor includes a nozzle piece that passes through the central opening.

3. The propulsion system of claim 2, wherein the nozzle piece is made of a phenolic.

4. The propulsion system of claim 1, further comprising a propeller operatively coupled to the electric motor, the propeller being driven to rotation by the electric motor.

5. The propulsion system of claim 4, wherein the propeller rotates about a central axis that is common to both the rocket motor and the electric motor.

6. The propulsion system of claim 4, wherein the propeller includes foldable propeller blades that fold from a yoke that is rotated by the rocket motor.

7. The propulsion system of claim 6, wherein the propeller blades have hinged connections to the yoke.

8. The propulsion system of claim 1, wherein the electric motor is a brushless outrunner electric motor, with a rotor of the electric motor radially outward of a stator of the electric motor.

9. The propulsion system of claim 1, wherein the rocket includes a rocket nozzle that provides a hub to support the electric motor.

10. The propulsion system of claim 9, further comprising a spacer between the rocket nozzle and electric motor.

11. The propulsion system of claim 10, wherein the spacer provides thermal isolation between the rocket nozzle and the electric motor.

12. The propulsion system of claim 10, wherein the spacer is made of aluminum.

13. The propulsion system of claim 1, wherein the electric motor includes a drum.

14. The propulsion system of claim 13, wherein the drum includes a rotor on an inner surface of the drum.

15. The propulsion system of claim 14, further comprising a yoke fixedly attached to an outside of the drum.

16. The propulsion system of claim 15, wherein propeller blades are hingedly coupled to the yoke.

17. The propulsion system of claim 13, further comprising bearings that allow the drum to rotate around a central axis of propulsion system.

18. An aircraft that includes the propulsion system of claim 1.

19. The aircraft of claim 18, wherein the aircraft is tube launched.

20. A method of operation of an aircraft, the method comprising:
    launching the aircraft from a launcher;
    propelling the aircraft with a rocket motor of a propulsion system of the aircraft; and
    subsequently propelling the aircraft with propeller blades that are coupled to an electric motor of the propulsion system, wherein the electric motor is an annular electric motor that surrounds part of the rocket motor.

* * * * *